A. KIMMEY & J. D. CAEL.
SPIGOT VALVE.
APPLICATION FILED FEB. 8, 1916.

1,211,595.

Patented Jan. 9, 1917.

Alfred Kimmey
Joseph D. Cael
*Inventors*

By
*Attorneys*

UNITED STATES PATENT OFFICE.

ALFRED KIMMEY, OF BROOKLYN, AND JOSEPH D. CAEL, OF ELMHURST, NEW YORK.

SPIGOT-VALVE.

1,211,595.   Specification of Letters Patent.   Patented Jan. 9, 1917.

Application filed February 8, 1916. Serial No. 76,960.

*To all whom it may concern:*

Be it known that we, ALFRED KIMMEY and JOSEPH D. CAEL, citizens of the United States, residing at Brooklyn and Elmhurst, in the counties of Kings and Queens and State of New York, respectively, have invented new and useful Improvements in Spigot-Valves, of which the following is a specification.

This invention relates to spigot valves, and its object is to provide a novel and improved valve facing which is swiveled on the valve stem so that it may seat without a turning movement, the valve stem only turning when screwed down. The purpose of this structure is to eliminate, or reduce to a minimum, the wear on the valve washer resulting from the rubbing and grinding action on the valve seat where, as in the ordinary spigot, the valve washer is seated with a turning movement.

The invention also has for its object to provide a swiveled holder for the valve washer, which can be easily applied to the stem of any ordinary spigot valve, without any change in the structure thereof.

With the objects stated in view, the invention consists in a novel combination and arrangement of parts to be hereinafter described and claimed, and in order that the same may be better understood, reference is had to the accompanying drawing in which—

Figure 1:
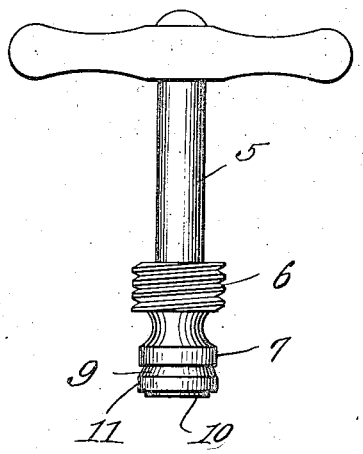
Figure 2:
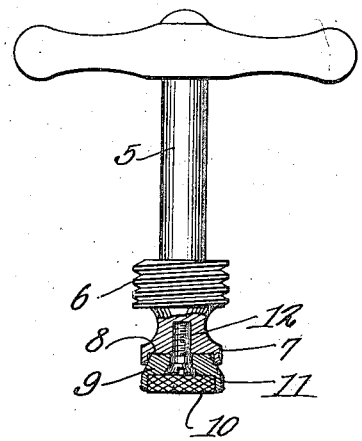

Figure 1 is an elevation of the valve, and Fig. 2 is a similar view partly in section.

Referring specifically to the drawing, 5 denotes the valve stem of an ordinary spigot, having a thread 6 as usual for effecting the opening and closing of the spigot. As ordinarily constructed, the seating end of the stem has an enlargement 7 which is provided with a bottom recess 8 in which is secured the washer which forms the valve face. As the valve closes with a turning movement the rubbing and grinding action of the washer on the valve seat results in rapid wear of the former so that the spigot leaks and frequent renewals of the washer become necessary. In order to eliminate this objectionable feature, we provide a swiveling connection between the valve stem and the washer, so that the latter may be screwed down on the seat without turning with the valve stem, the latter only turning. The swiveling connection is had by mounting on the end of the valve stem 5 a holder 9 for the washer 10. This holder is a plug which is shaped at the top to fit in the recess 8 and has at the bottom a depending marginal flange 11 forming a recess in which the washer is seated, the latter fitting tightly inside the flange and also held in place by the water pressure. At the center of the plug is an aperture through which passes a screw 12, the same being screwed into the bottom of the valve stem enlargement 7. The plug is swiveled on the screw, and it will therefore be evident that the washer does not turn and scrape the valve seat when it is forced down thereon by the turning of the valve stem.

The device is extremely simple and inexpensive, and it can be applied without any change in the structure of the spigot. All that is necessary is to remove the old washer from the recess 8 and mount the plug 9 therein by means of the screw 12, and then apply the washer 10. This operation is possible for the reason that the diameter of the recess defined by the flange 11 is the same as the diameter of the recess 8. The device will be manufactured and sold separately from the valve and is designed to take the place of the washer which, in the old valve structure, occupies the recess 8, and the same sized washers may be mounted in the recess defined by the flange 11. As the washer covers the head of the screw, there is no danger of the latter unscrewing, and before the plug can be taken off, the washer must be removed. The washer also prevents any liquid from forcing its way past the screw, thereby eliminating all danger of leakage. The screw is not threaded throughout its entire length, that portion of the screw which passes through the plug being unthreaded, so as not to interfere with the free swiveling action.

We claim:—

1. The combination with a valve stem having a recessed seating end, of a plug swivelingly mounted in said recess and having a marginal flange in its outer face defining a recess which has the same diameter as the recess in the seating end of the valve stem, and a valve washer seating in the recess of the plug.

2. The combination with a valve stem having a recessed seating end, of a plug swivelingly mounted in said recess and having a marginal flange in its outer face defining a recess which has the same diameter as the recess in the seating end of the valve stem, and a valve washer seating in the recess of the plug, the swiveling connection between the plug and the valve stem being a screw passing through the plug into the valve stem, and having its head covered by the washer, that portion of the screw shank which passes through the plug being devoid of threads.

In testimony whereof we affix our signatures.

ALFRED KIMMEY.
JOSEPH D. CAEL.